(12) United States Patent
Biswas et al.

(10) Patent No.: US 12,001,854 B2
(45) Date of Patent: Jun. 4, 2024

(54) SYSTEMS, METHODS, AND MEDIA FOR SHARING INFORMATION WITH VENDOR APPLICATIONS IN SECURE ENVIRONMENTS

(71) Applicant: McAfee, LLC, San Jose, CA (US)

(72) Inventors: Shuborno Biswas, Waterloo (CA); Annapoorani Natarajan, Bangalore (IN); Balaji Rao, Bangalore (IN); Christopher Roy, Waterloo (CA); Dipeka A.J, Bangalore (IN)

(73) Assignee: McAfee, LLC, San Jose, CA (US)

( * ) Notice: Subject to any disclaimer, the term of this patent is extended or adjusted under 35 U.S.C. 154(b) by 336 days.

(21) Appl. No.: 17/546,602

(22) Filed: Dec. 9, 2021

(65) Prior Publication Data
US 2023/0115599 A1 Apr. 13, 2023

(30) Foreign Application Priority Data
Oct. 8, 2021 (IN) .............................. 202111045945

(51) Int. Cl.
*G06F 9/44* (2018.01)
*G06F 8/61* (2018.01)
*G06F 9/445* (2018.01)
*G06F 9/54* (2006.01)

(52) U.S. Cl.
CPC ............ *G06F 9/44505* (2013.01); *G06F 8/61* (2013.01); *G06F 9/4451* (2013.01); *G06F 9/541* (2013.01)

(58) Field of Classification Search
CPC ................. G06F 1/32; G06F 9/44; G06F 1/12
See application file for complete search history.

(56) References Cited

U.S. PATENT DOCUMENTS

2017/0347224 A1* 11/2017 Robba .................... G06F 21/445
2021/0064756 A1* 3/2021 Schrag ................... G06F 21/57

* cited by examiner

*Primary Examiner* — Keshab R Pandey
(74) *Attorney, Agent, or Firm* — Byrne Poh LLP

(57) ABSTRACT

Mechanisms for sharing user-provided information from an original equipment manufacturer (OEM) application and a vendor application are provided, the mechanisms including: receiving the user-provided information at the OEM application; determining a system identifier of a system on which the OEM application is executing at the OEM application using a hardware processor; providing the user-provided information and the system identifier to a vendor cloud server from the OEM application; determining the system identifier at vendor application; providing the system identifier from the vendor application to the vendor cloud server; receiving the user-provided information at the vendor application from the vendor cloud server in response to providing the system identifier to the vendor cloud server; and using the user-provided information to configure the vendor application.

20 Claims, 7 Drawing Sheets

SYSTEMS, METHODS, AND MEDIA FOR SHARING INFORMATION WITH VENDOR APPLICATIONS IN SECURE ENVIRONMENTS

CROSS-REFERENCE TO RELATED APPLICATION

This application claims the benefit of Indian Patent Application No. 202111045945, filed Oct. 8, 2021, which is hereby incorporated by reference herein in its entirety.

BACKGROUND

Software, such as cybersecurity software (which can include antivirus software, intrusion detection software, firewall software, and/or any other suitable software for protecting computing devices), often comes pre-loaded on computing devices (which can include any suitable computing devices such as desktop computers, laptop computers, tablet computers, smart phones, smart appliances, and/or any other suitable computing devices). This can be convenient for both the consumer (who does not need to install the software) and the software vendor (who knows the software will be installed correctly and who has a sales advantage over competitors due to the software already being on the computing device).

In some instances: preloaded software receives information about a user from a computing device's original equipment manufacturer (OEM); a subscription to preloaded software can be set up for a computing device by the OEM; and a preloaded software's behavior can be customized by the OEM per contractual terms between a vendor of the preloaded software and the OEM.

Previous solutions to enable preloaded software to receive information from the OEM, have subscriptions set up by the OEM, and have behavior customized by the OEM have relied upon two softwares on the same device (for example, one from a computing device's OEM and one from a software vendor) being able to read the same data from disk or hardware/Basic Input/Output System (BIOS) and/or being able to communicate with each other. These separate softwares read that data from OEM-specific locations (such as the file system or BIOS where the OEM stores unique attributes for their machines) and/or operating system-specific locations (such as a privileged, encrypted data file containing a user's email address that a software vendor could decrypt, or the registry for a WINDOWS installation-specific machine identifier).

A problem with these solutions is that closed operating system (O/S) variants of WINDOWS (such as WINDOWS 10 in S Mode or 10x) and other O/Ss do not provide this manner of open access to APIs and data stores.

Accordingly, new systems, methods, and media for sharing information with vendor applications in secure environments are desirable.

SUMMARY

In accordance with some embodiments, mechanisms, including systems, methods, and media, for sharing user-provided information from an original equipment manufacturer (OEM) application and a vendor application are provided.

More particularly, in some embodiments, methods for sharing user-provided information from an original equipment manufacturer (OEM) application and a vendor application are provided, the methods comprising: receiving the user-provided information at the OEM application; determining a system identifier of a system on which the OEM application is executing at the OEM application using a hardware processor; providing the user-provided information and the system identifier to a vendor cloud server from the OEM application; determining the system identifier at vendor application; providing the system identifier from the vendor application to the vendor cloud server; receiving the user-provided information at the vendor application from the vendor cloud server in response to providing the system identifier to the vendor cloud server; and using the user-provided information to configure the vendor application.

In some of these methods, the user-provided information includes an email address of a user.

In some of these methods, the OEM application and the vendor application are being executed on a locked-down operating system.

In some of these methods, the locked-down operating system is a locked-down version of MICROSOFT WINDOWS.

In some of these methods, determining the system identifier at the OEM application includes receiving the system identifier from an application programming interface (API) of a locked-down operating system on which the OEM application is executing.

In some of these methods, determining the system identifier at the vendor application includes receiving the system identifier from an application programming interface (API) of a locked-down operating system on which the vendor application is executing.

In some of these methods, the methods further comprise receiving instructions to customize the vendor application from the vendor cloud server in response to providing the system identifier to the vendor cloud server.

In some embodiments, systems for sharing user-provided information from an original equipment manufacturer (OEM) application and a vendor application are provided, the systems comprising: a memory; and at least one hardware processor collectively configured to: receive the user-provided information at the OEM application; determine a system identifier of a system on which the OEM application is executing at the OEM application; provide the user-provided information and the system identifier to a vendor cloud server from the OEM application; determine the system identifier at vendor application; provide the system identifier from the vendor application to the vendor cloud server; receive the user-provided information at the vendor application from the vendor cloud server in response to providing the system identifier to the vendor cloud server; and use the user-provided information to configure the vendor application.

In some of these systems, the user-provided information includes an email address of a user.

In some of these systems, the OEM application and the vendor application are being executed on a locked-down operating system.

In some of these systems, the locked-down operating system is a locked-down version of MICROSOFT WINDOWS.

In some of these systems, determining the system identifier at the OEM application includes receiving the system identifier from an application programming interface (API) of a locked-down operating system on which the OEM application is executing.

In some of these systems, determining the system identifier at the vendor application includes receiving the system identifier from an application programming interface (API) of a locked-down operating system on which the vendor application is executing.

In some of these systems, the at least one hardware processor is collectively further configured to receive instructions to customize the vendor application from the vendor cloud server in response to providing the system identifier to the vendor cloud server.

In some embodiments, non-transitory computer-readable media containing computer-executable instructions that, when executed by a processor, cause the processor to perform a method for sharing user-provided information from an original equipment manufacturer (OEM) application and a vendor application are provided, the method comprising: receiving the user-provided information at the OEM application; determining a system identifier of a system on which the OEM application is executing at the OEM application; providing the user-provided information and the system identifier to a vendor cloud server from the OEM application; determining the system identifier at vendor application; providing the system identifier from the vendor application to the vendor cloud server; receiving the user-provided information at the vendor application from the vendor cloud server in response to providing the system identifier to the vendor cloud server; and using the user-provided information to configure the vendor application.

In some of these non-transitory computer-readable media, the user-provided information includes an email address of a user.

In some of these non-transitory computer-readable media, the OEM application and the vendor application are being executed on a locked-down operating system.

In some of these non-transitory computer-readable media, determining the system identifier at the OEM application includes receiving the system identifier from an application programming interface (API) of a locked-down operating system on which the OEM application is executing.

In some of these non-transitory computer-readable media, determining the system identifier at the vendor application includes receiving the system identifier from an application programming interface (API) of a locked-down operating system on which the vendor application is executing.

In some of these non-transitory computer-readable media, the method further comprises receiving instructions to customize the vendor application from the vendor cloud server in response to providing the system identifier to the vendor cloud server.

DETAILED DESCRIPTION

In accordance with some embodiments, new mechanisms (including systems, methods, and media) for sharing information with vendor applications in secure environments are provided.

In accordance with some embodiments, the mechanisms described herein can overcome the limitation of closed O/S variants by tying together softwares on the same computing device and sharing data between those softwares using a combination of data preloaded to the computing device at the factory and cloud services connected to OEM software and vendor software after the computing device has been sold.

In factory (or other location) imaging processes for a computing device, an OEM can preload a vendor's software using the vendor's software's install script(s) and code to interface with the O/S, with the OEM providing name-value pairs of OEM-specific input data.

In accordance with some embodiments, a "seed" data format and content can be defined by a vendor and can be versioned, rather than being static data from an OEM with a locked format. In some embodiments, this technique allows an OEM to specify parameters (such as terms (i.e., 30-day trial, 1 year trial) of a vendor's subscription that comes with a computing device, or the machine model or service tag) via scripts and command-line parameters (as opposed to pre-generated static files).

In some embodiments, when launched (automatically or manually by the user), a vendor's software can communicate with one or more cloud services of the vendor using a common identifier and the "seed" data sourced from an installation script on a computing device. In some embodiments, the cloud services can then reconcile the information provided by this software and OEM software to: (1) initiate customized behavior for the vendor's software on the device (such as enabling security features, with settings customized to the OEM's requirements); and/or (2) initiate customized behaviors in the cloud service (such as starting to protect the user's account and identity customized as per the OEM's requirements, and/or setting up the user's subscription and sending the user an email to an OEM-provided email address).

Figure 1:
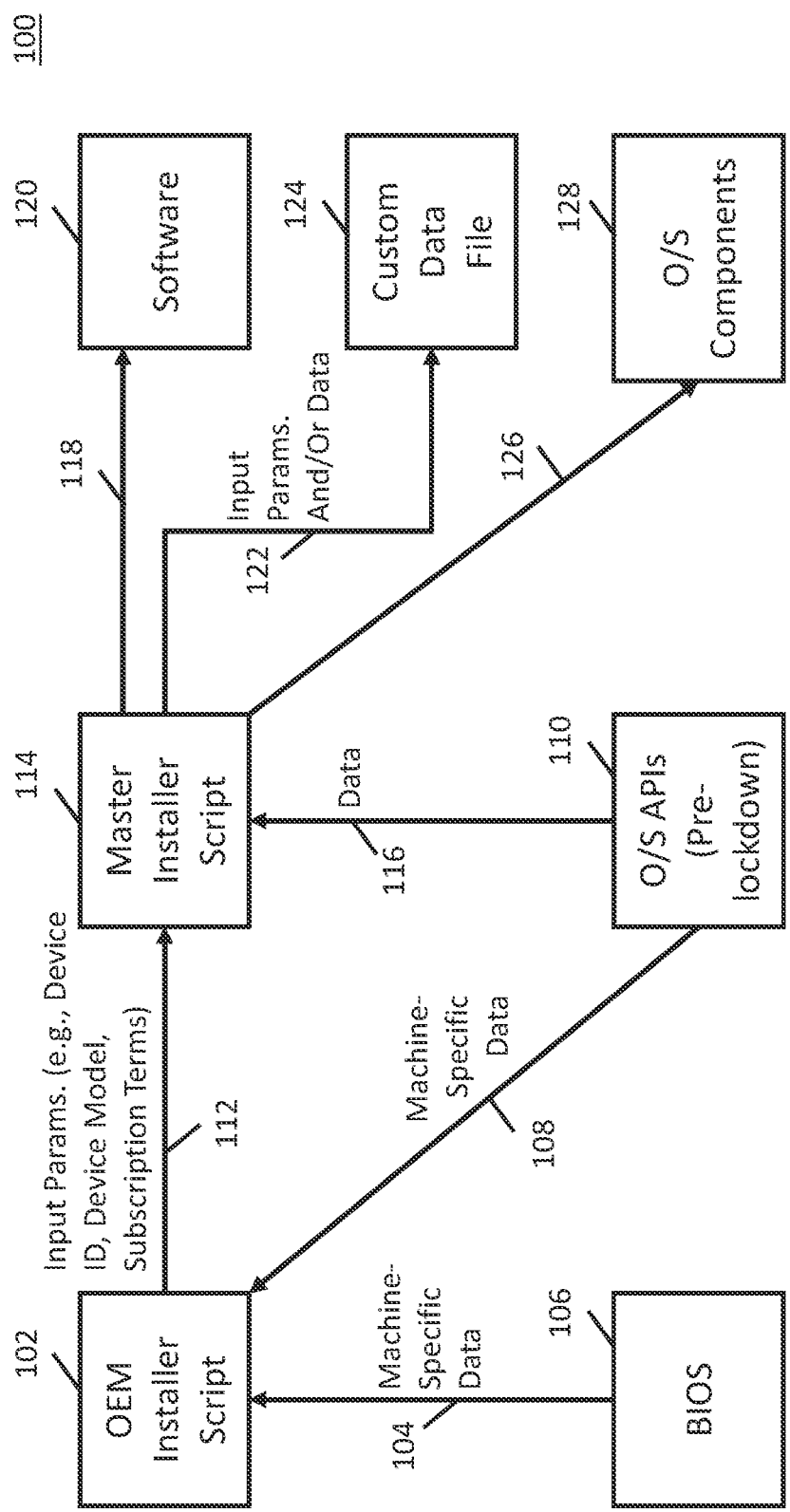
FIG. 1 is an example block diagram showing a process through which software can be installed on a computing device at a factory (or any other suitable location) in accordance with some embodiments.

Turning to FIG. 1, an example 100 of a process through which software can be installed on a computing device at a factory (or any other suitable location) in accordance with some embodiments is illustrated. As shown, an OEM installer script 102 can get executed on the computing device at the factory (or any other suitable location). Script 102 can receive machine specific data 104 from the computing device's BIOS 106 and/or can receive machine specific data 108 from the computing devices O/S's application programming interfaces (APIs) 110 before the O/S is locked down.

Script 102 can then provide input parameters 112 to a master installer script 114. Any suitable input parameters can be provided, such as an identifier of the computing device, a model of the computing device, and/or subscription terms for software, in some embodiments.

Script 114 can also receive data 116 from APIs 110. Data 116 can be any suitable data, such as operating system unique software installations identifiers and hardware model identifiers (e.g., from BIOS, graphics cards, etc.), in some embodiments.

Next, at 118, script 114 can cause vendor software 120 to be installed on the computing device. Any suitable software 120, such as WIN 32 or UNIVERSAL WINDOWS PLATFORM (UWP) apps, can be installed in some embodiments. This installation can be performed in any suitable manner using any suitable files in some embodiments.

Script 114 can generate a custom data file (CDF) 124 using any suitable input parameters and/or data 122. The CDF can have any a suitable format and any suitable content in some embodiments. For example, in some embodiments, the CDF can have a versioned, app-specific schema.

In some embodiments, master installer script 114 is able to leverage running code on the computing device in order to unlock machine-specific data which would otherwise not be possible without script 114. For example, an OS that is not locked down will allow software to read privileged locations on disk (such as on WINDOWS, the Registry and all areas of the file system), call APIs that interface with hardware drivers to get information from them. In contrast, a locked down OS by definition limits that API access.

Script 114 can cause O/S components 128 to be installed at 126. This installation can be performed in any suitable manner using any suitable files in some embodiments.

Finally, the computing device's O/S can be locked down and sold to a customer. In this context, being locked down can include forcing apps to run in a sandboxed, isolated mode where they do not have access to all of the operating system resources and APIs that an unlocked OS would have. For example, apps in WINDOWS 10 in S Mode cannot access the WINDOWS Registry, and apps in WINDOWS 10 HOME and WINDOWS 10 PRO can.

In some embodiments, master installer script 114 accepts command-line input parameters from an OEM and/or vendor for installation of individual vendor components, such as (i) software 120, (ii) an integration service, and/or (ii) operating system components 128.

In some embodiments, master installer script 114 forms the data of the custom data file (CDF) installed with software 120 in order to (i) differentiate factory pre-installations from store installations, (ii) include OEM-sourced data in the CDF generated from factory imaging scripts (i.e., not static data), and (iii) seed any data required to be processed later by a cloud service (e.g., on a cloud server) to customize software 120 or services that the user of the computing device might be entitled to.

In some embodiments, once the CDF is generated, the CDF can be copied to a file system location belonging to a UWP app so that the CDF can be accessed when the UWP app is installed and/or run.

In some embodiments, the technique of using the master installer script to install software 120 (e.g., a UWP app) allows a software vendor to generate and control the schema and content of the CDF. This couples the CDF format to software 120.

In some embodiments, a software vendor can change the schema for the CDF data every time it delivers a script and new software for a computing device, meaning later in the process a cloud service (e.g., on a cloud server) can activate new customizations with no coupling to how the OEM vendor wrote their factory imaging scripts or defined their CDF.

In some embodiments, OEM-exclusive data can be shared from a user to a cloud service (e.g., on a cloud server) using a device identifier for linking. Any suitable device identifier can be used in some embodiments, the device identifier can have any suitable format, and the device identifier can link in any suitable manner, in some embodiments.

There are several pieces of data for which the OEM has exclusive access on WINDOWS 10 in S Mode, such as: a data from personal computer's boot-up Out-of-Box-Experience (DOBE) (e.g., including a user email address and consent to share that email address with a vendor of software 120); additional or future user inputs (e.g., phone number and customization preferences); and data from OEM apps, NT services, and drivers (e.g. device hardware-specific information (such as full BIOS information and custom hardware information)).

In some embodiments, during DOBE, a user can share his or her consent to share his or her email address with a vendor of software 120 for DOBE registration. In some embodiments, the OEM app may then share this email address with a vendor's cloud service along with one or more available device identifiers.

In some embodiments, a device identifier can be: (1) a factory-set device identifier provided by the OEM to master installer script 114; (2) a runtime device identifier that remains the same for an app across different WINDOWS user logins (GetSystemIDForPublisher WINRT API); and/or (3) a runtime device identifier that varies for each WINDOWS user login but remains the same across all apps on the machine (GetSystemIDForUser WinRT API).

In some embodiments, these device identifiers can be persisted at the vendor's cloud service to link relevant information from and/or to one or more apps on the same device later.

In some embodiments, OEM-exclusive data about the user and the system is available in a vendor's cloud service. In some embodiments, software 120 can link to that data using the device identifiers to use it for software and service behavior customization.

In some embodiments, in an example system in which software 120 is a vendor UWP app on WINDOWS 10 in S Mode, the vendor UWP app's first code execution can be approximately 15 minutes (or any other suitable period of time) after the Out-of-Box-Experience (DOBE) process has completed, triggered by a pre-installation configuration task. At the point of code execution, the vendor UWP app can enroll itself to a vendor's cloud service (e.g., on a vendor's cloud server), which can look for OEM-exclusive data associated with the vendor's app in some embodiments. In some embodiments, this enrollment can be performed by passing to the vendor's cloud full payload of a custom data file as well as a device identifier that was also used by the OEM. This device identifier can be from the same sources described above: (1) a factory-set device identifier provided by the OEM to master installer script 114, now embedded in the custom data file; (2) a runtime device identifier that remains the same for an app across different WINDOWS user logins (GetSystemIDForPublisher WinRT API); and/or (3) a runtime device identifier that varies for each WINDOWS user login but remains the same across all apps on the machine (GetSystemIDForUser WinRT API).

In some embodiments, the vendor's cloud service can then perform a device linking operation which compares the received device identifier to device identifiers available in the database of OEM-exclusive data. If the received device identifier is found, the full set of OEM-provided data—both from factory and shared at run time—can be associated with a particular vendor app on a computing device, in some embodiments. In some embodiments, this allows for customization of: (1) the vendor's cloud service behavior for the user, customized relative to the custom data file parameters; and (2) the vendor's app behavior for the user, customized relative to the previously OEM-exclusive user information and custom data file parameters.

Figure 2:
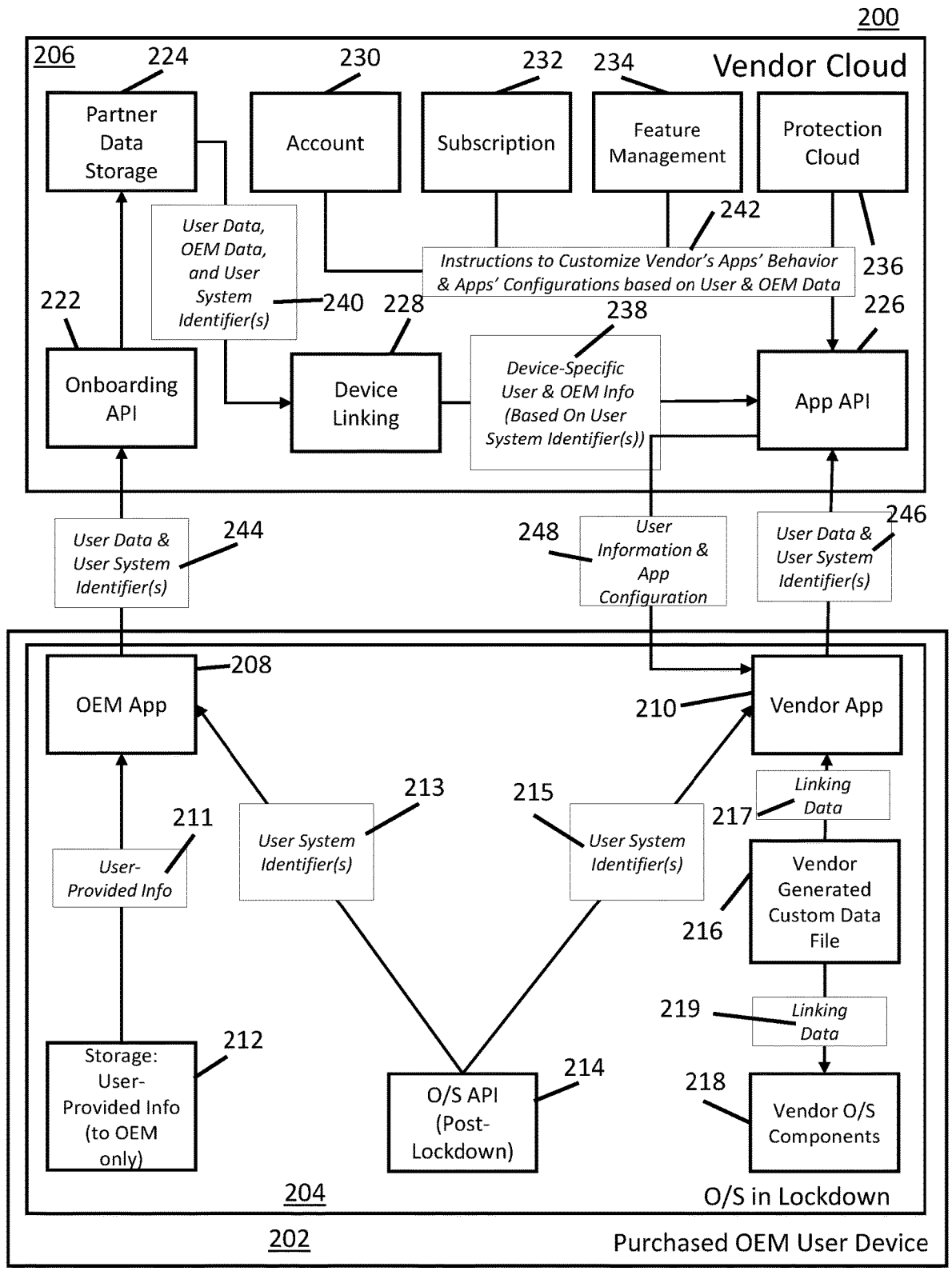
FIG. 2 is an example block diagram showing data flow post-lockdown of a user device in accordance with some embodiments.

Turning to FIG. 2, an example 200 of block diagram showing data flow post-lockdown of a user device in accordance with some embodiments is shown. As illustrated, FIG. 2 shows a purchased OEM user device 202 having a locked-down O/S 204 and a vendor cloud service 206.

As shown, O/S 204 has OEM app 208 and vendor app 210 running on it (obviously, other apps may be running on O/S 204 as well) in some embodiments.

In some embodiments, OEM app 208 receives user-provided information 211 from storage 212 and receives user system identifier(s) 213 from an O/S API 214. In some embodiments, OEM app 208 sends user data and user system identifier(s) 244 to onboarding API 222. API 222 can then provide this data to partner data storage 224, which can be any suitable storage for storing data, in some embodiments. Storage 224 can then provide user data, OEM data, and user system identifier(s) 240 to device linking mechanism 228, which can provide device-specific user and OEM information 238 based on the user systems identifier(s) in 244 and 246 (discussed below) to app API 226.

Vendor app 210 can receive user system identifier(s) 215 from O/S API 214 as well as linking data 217 from vendor generated custom data file 216 in some embodiments. Vendor O/S components 218 can also receive linking data 219 from vendor generated custom data file 216 in some embodiments. Each of linking data 217 and 219 can include any suitable data and the data may be the same in both of linking data 217 and 219 or may be different in some embodiments.

Vendor app 210 can provide user data and user system identifier(s) 246 to app API 226.

Instructions 242 to customize the vendor's apps' behavior and apps' configuration(s) based on user and OEM data can be provided from one or more of account process 230, subscription process 232, feature management process 234, and protection cloud process 236 to app API 226.

App API 226 can provide user information and app configuration(s) 248 to vendor app 210 in some embodiments.

In some embodiments, when a user launches a vendor's UWP app, the user can be provided with a user interface to register with the vendor. This user interface can be prepopulated with an email address provided by the user during DOBE. This is made possible by linking the information using device identifiers at the vendor's cloud service. The user can be provided with an option to set a password and proceed to register using the same email address in some embodiments. In some embodiments, the user can also opt to provide a completely new email address and register to avail the factory entitled terms and features.

Figure 3A:
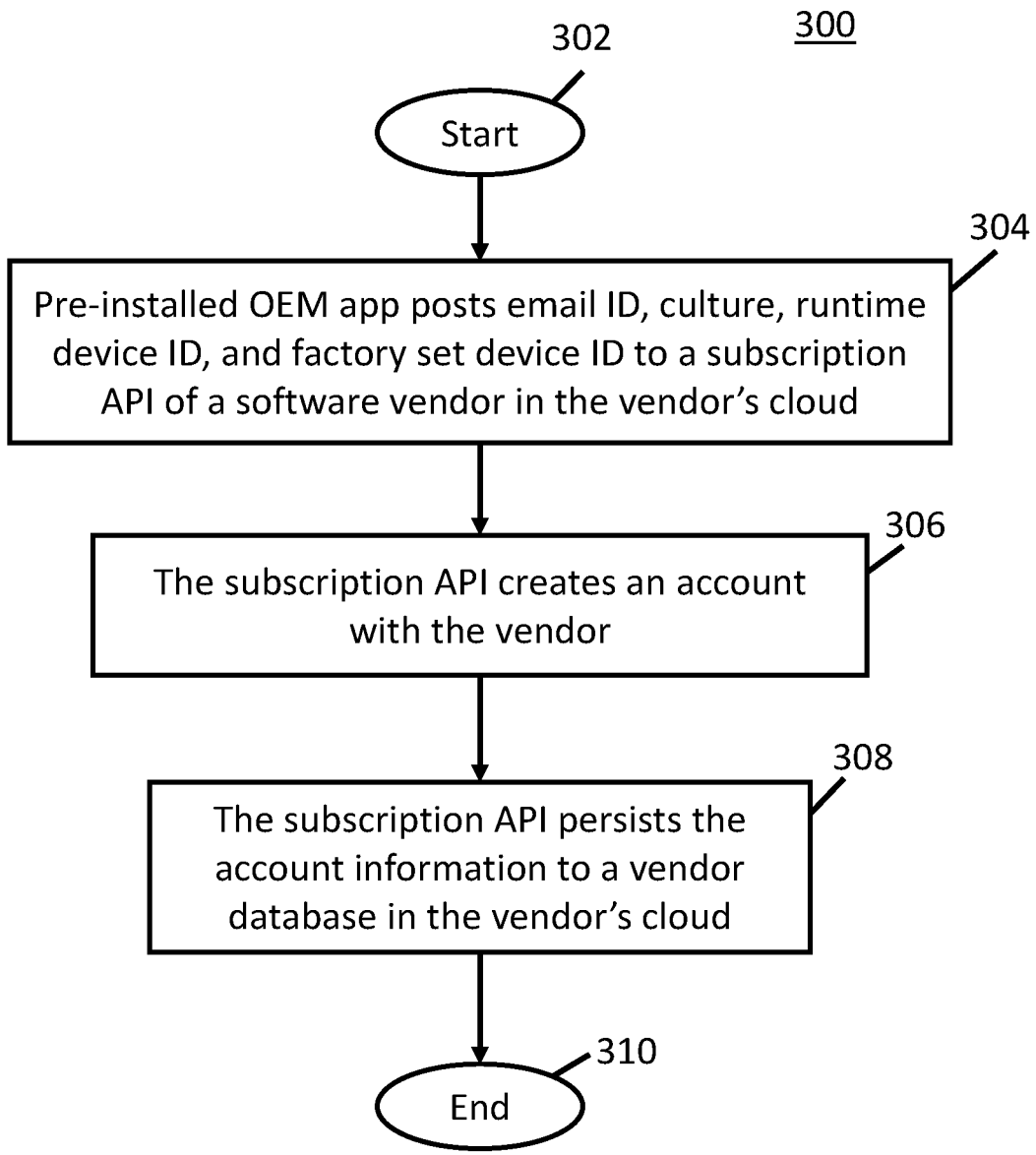
FIG. 3A is an example flow diagram of a process for an OEM app call sequence in accordance with some embodiments.

Turning to FIG. 3A, an example 300 of a process for an OEM app call sequence in accordance with some embodiments is illustrated.

As shown, after process 300 begins at 302, at 304, a pre-installed OEM app (e.g., a Win 32 app or a UWP app) posts an email identifier, a culture identifier, a runtime device identifier, a factor set device identifier, and/or any other suitable account information to a subscription API of a software vendor in the vendor's cloud service. This account information can be posted to the subscription API in any suitable manner, and any suitable subscription API can be used, in some embodiments.

In some embodiments, the WinRT API GetSystemIDForUser, which returns the same identifier for both an OEM app and a vendor's app as long as the same WINDOWS user is logged in, can be used to generate the runtime device identifier.

Next, at 306, the subscription API can create an account with the vendor in some embodiments. The account can be created in any suitable manner and can be associated with any suitable account information in some embodiments.

Then, at 308, the subscription API persists the account information in a vendor database in the vendor's cloud service. The account information can be persisted in any suitable manner in some embodiments.

Finally, process 300 can end at 310.

Figure 3B:
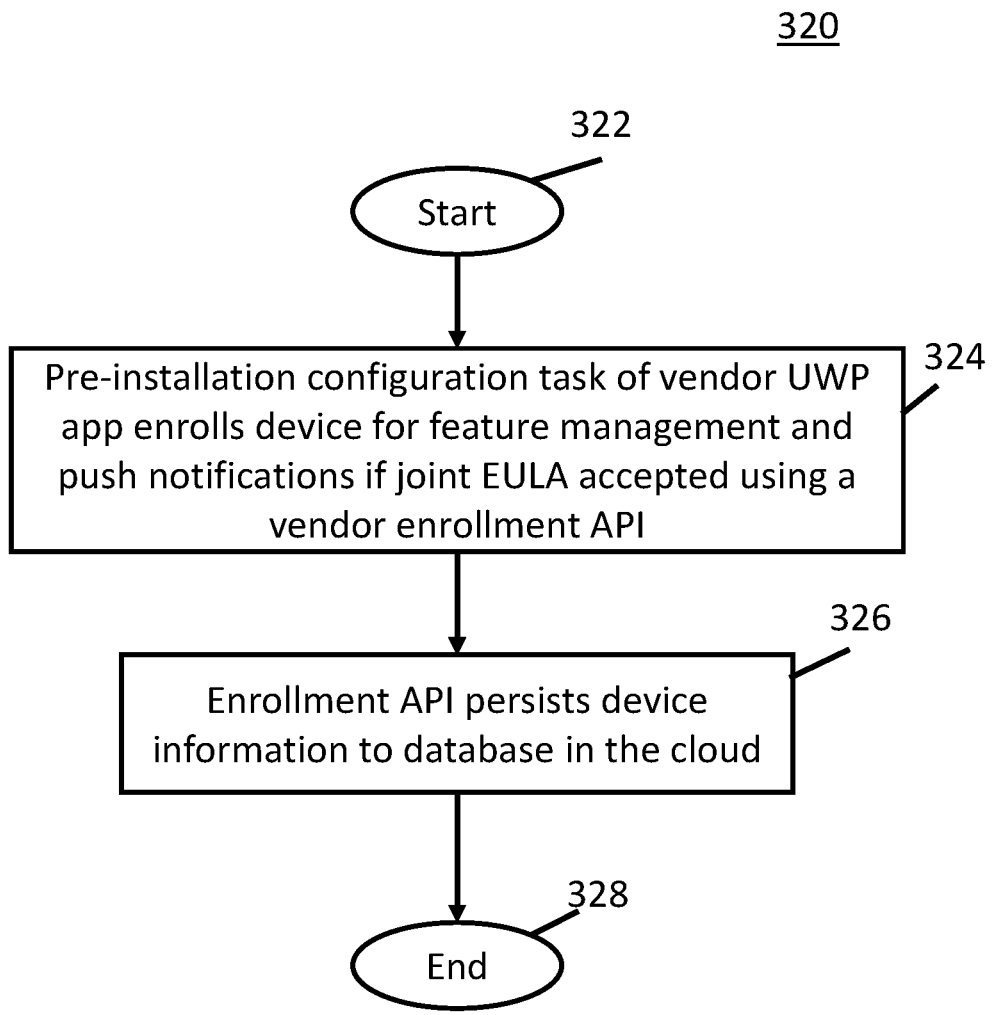
FIG. 3B is an example flow diagram of a vendor UNIVERSAL WINDOWS PLATFORM (UWP) app device enrollment sequence in accordance with some embodiments.

Turning to FIG. 3B, an example 320 of a process for a vendor UWP app device enrollment sequence in accordance with some embodiments is illustrated.

As shown, after process 320 begins at 322, at 324, a pre-installed vendor UWP app can perform a pre-installation configuration task in which it enrolls the device on which it is running for feature management and push notifications if a joint EULA has been accepted by the user using a vendor enrollment API running in the vendor's cloud service. The enrollment can be performed in any suitable manner in some embodiments.

Next, at 326, the enrollment API can persist device information to the vendor's cloud database. This persisting can be performed in any suitable manner in some embodiments.

Finally, process 3220 can end at 328.

Figure 3C:
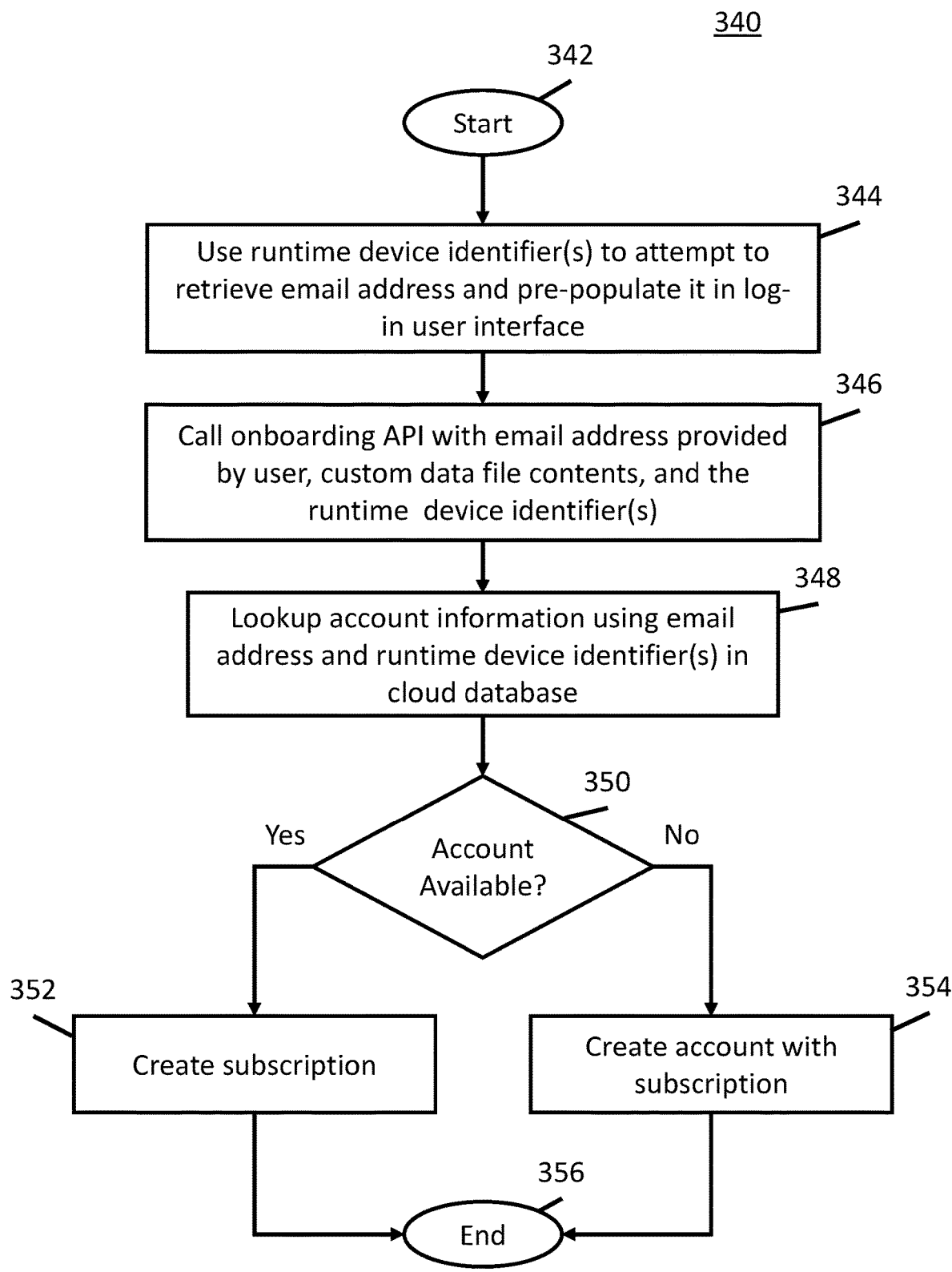
FIG. 3C is an example flow diagram of a vendor UWP app onboarding sequence in accordance with some embodiments.

Turning to FIG. 3C, an example 340 of a process for a vendor UWP app onboarding sequence in accordance with some embodiments is illustrated. As shown, after process 340 begins at 342, at 344, the process uses a runtime device identifier(s) (as described above) to attempt to retrieve an email address corresponding to the runtime device identifier(s) from a vendor's cloud service. The email address can be an email address provided by a user during DOBE if the user has given consent for the email address to be shared. Process 340 can attempt to retrieve the email address in any suitable manner, such as using a suitable API of the vendor's cloud service. If the email address is retrieved, then process can pre-populate the email address into a log-in user interface. The email address can be populated into the user interface in any suitable manner.

Next, at 346, the process can call an onboarding API with the retrieved email address or an email address entered by a user, custom data file contents, and the runtime device identifier(s).

Then, at 348, process 340 can lookup account information using the email address and the runtime device identifier(s) from the vendor's cloud database. This lookup can be performed in any suitable manner in some embodiments.

Process 340 can next determine at 350 if an account corresponding to the email address and the runtime device identifier(s) is available. This determination can be made in any suitable manner in some embodiments.

If an account is determined to be available at 350, then, at 352, process 340 can create a subscription for the account. This subscription can be created in any suitable manner and can be associated with any suitable information in some embodiments.

If an account is determined to not be available at 350, then, at 354, process 340 can create an account with a subscription for the account. The account with subscription can be created in any suitable manner and can be associated with any suitable information in some embodiments.

Finally, after 352 or 354, process 340 can end at 356.

Figure 3D:
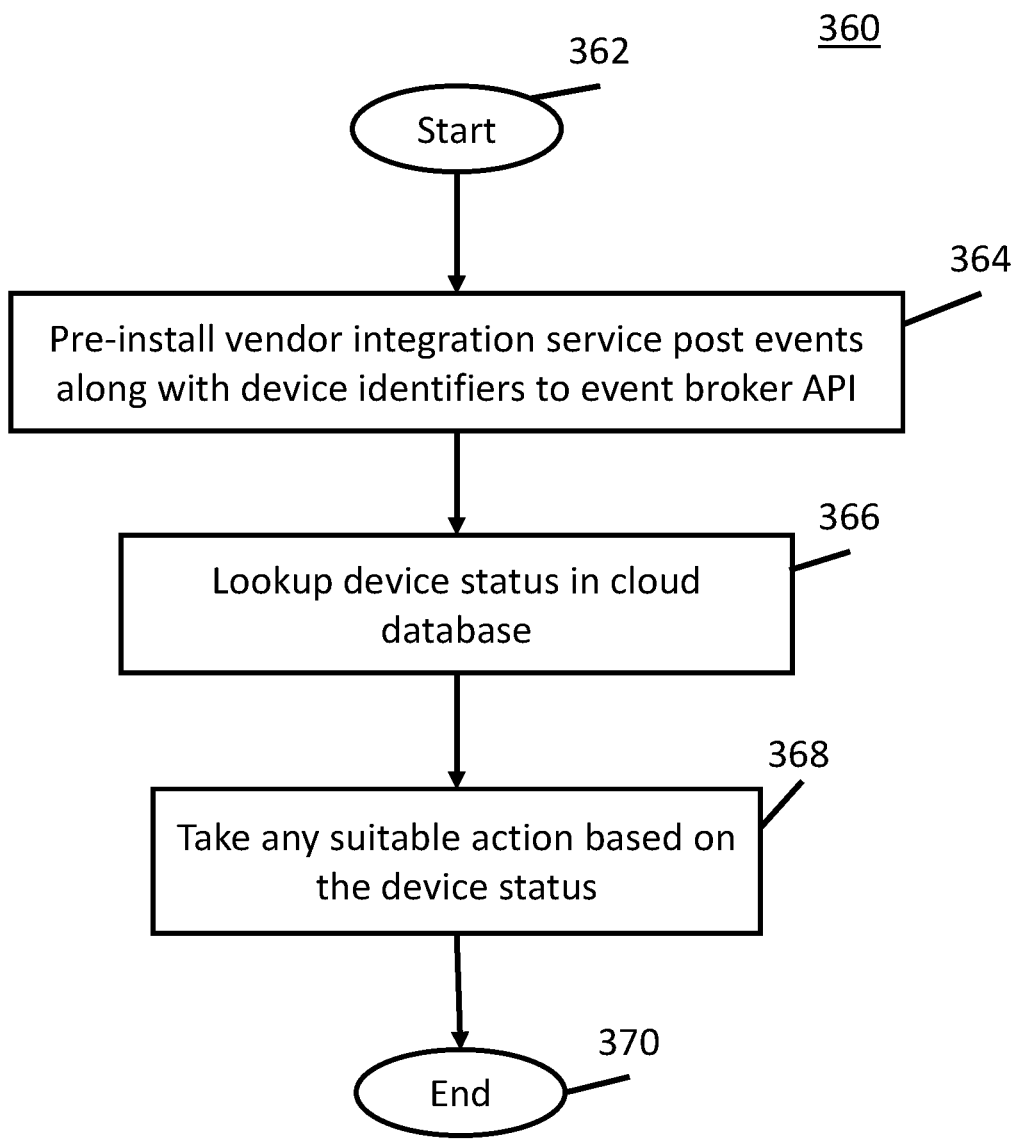
FIG. 3D is an example flow diagram of a vendor app integration flow in accordance with some embodiments.

Turning to FIG. 3D, an example 360 of a process for a vendor app integration flow in accordance with some embodiments is illustrated. As shown, after process 360 begins at 362, at 364, a pre-installation vendor integration service posts events along with device identifiers to an event broker API. The integration service can post any suitable events along with any suitable device identifiers, and these posts can be made in any suitable manner, in some embodiments.

Next, at 366, process 360 can look up the devices status in a vendor's cloud database. This lookup can be performed in any suitable manner and any suitable status information can be returned in some embodiments.

The, at 368, process 360 can take any suitable action based on the device status. For example, in some embodiments, process 360 can cause a message to be presented to the used offering the user to add, remove, and/or replace one or more applications on the user's device. As another example, in some embodiments, process 360 can, in response to a user accepting one or more offers or automatically based on a user being so entitled, automatically add, remove, and/or replace one or more applications on the user's device.

Finally, at 370, process 360 can end.

In some embodiments, vendor marketing and app behaviors are different based on the platform a user is running on. One example is that on a single personal computer that started running in WINDOWS 10 in S Mode, the user can switch to "regular" WINDOWS 10 HOME or WINDOWS 10 PRO which removes restrictions on privileged access (for example, allowing for anti-virus software to run).

Such a switch is detectable in real-time from a running NT Service, but not a UWP app.

In some embodiments, the mechanisms described herein can use linking, data sharing, and customization as described herein to access the factory-set custom data file (due to privileged access), WINDOWS APIs, inclusive of APIs that the UWP app uses for device identifiers being read at run-time, and can call the vendor's app API with this information based on the switch event. The vendor's cloud service can customize its services, including the ones that control the behavior of apps on the device including the UWP App (i.e., the app is unable to detect the switch event by itself). Example customizations possible by having both switch detection and UWP app use the same data linking mechanism are having the UWP app user interface tell the user that software is available, or modifying the behavior of a vendor's services, such as changing marketing emails to the user's email address to indicate that software is available to install now that the user has switched out of S Mode.

When a vendor's app calls its app API in the vendor's cloud for the first time, in some embodiments, it can pass the custom data file to the app API. The vendor's cloud can create a subscription and set an expiry date using the terms and/or the computing device model, look up features associated with the subscription and their configurations using the partner identifier, turning some features on, some features off, and customizing cloud service-driven behavior according to the terms of the vendor's contract with the OEM, such as messaging frequency.

Regarding a subscription use case, in some embodiments, subscription entitlement (i.e., which product and which features) and terms (i.e., expiry date) can be dynamic based on the machine model in lieu of the input terms if desired.

Figure 4:
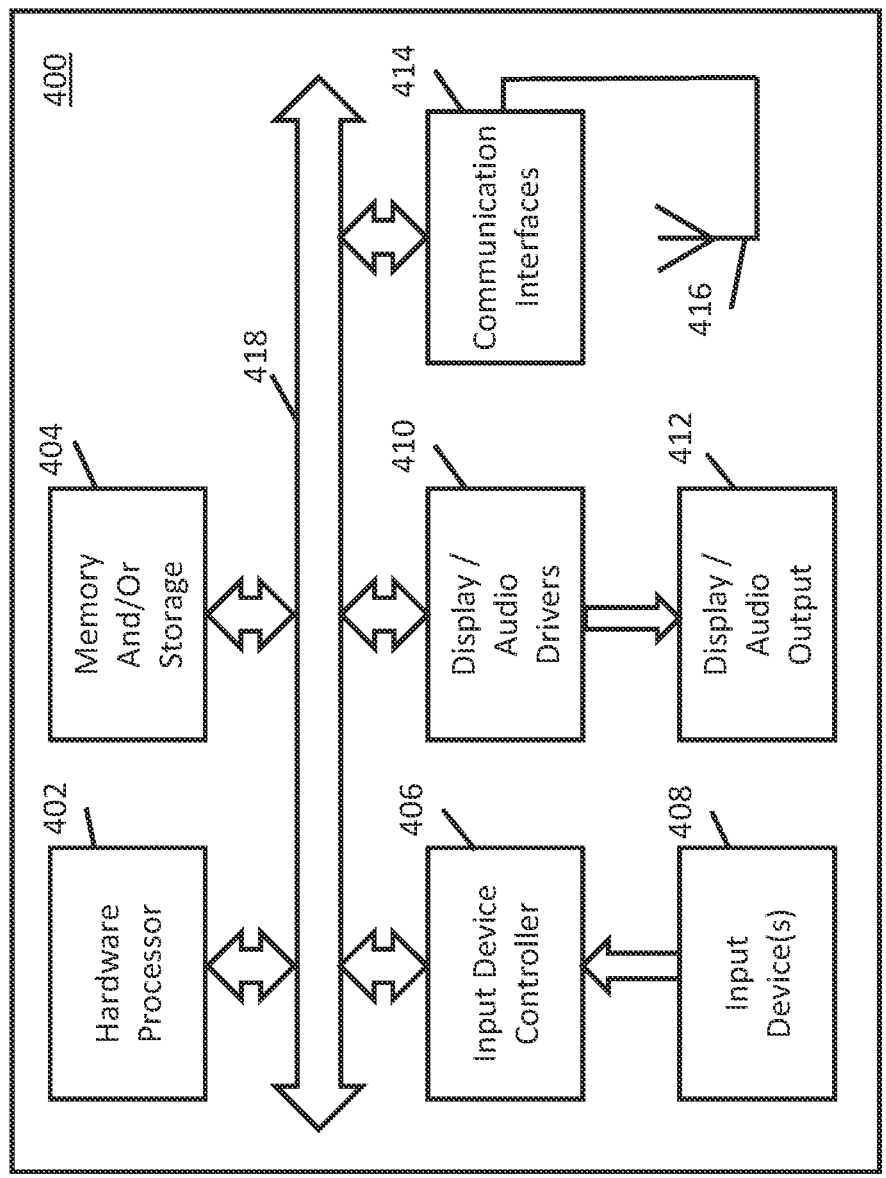
FIG. 4 is an example block diagram of hardware in accordance with some embodiments.

The processes and techniques described herein can be implemented using any suitable hardware in some embodiments. For example, in some embodiments, the processes and techniques described herein can be implemented using any suitable general-purpose computer or special-purpose computer(s). Any such general-purpose computer or special-purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from input device(s) 408, such as a game controller, in some embodiments. For example, input device controller 406 can be circuitry for receiving input from an input device 408, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output circuitries 412 in some embodiments. For example, display/audio drivers 410 can be circuitry for driving one or more display/audio output circuitries 412, such as an LCD display, a speaker, an LED, or any other type of output device. Communication interface(s) 414 can be any suitable circuitry for interfacing with one or more communication networks. For example, interface(s) 414 can include network interface card circuitry, wireless communication circuitry, and/or any other suitable type of communication network circuitry.

Antenna 416 can be any suitable one or more antennas for wirelessly communicating with a communication network in some embodiments. In some embodiments, antenna 416 can be omitted when not needed.

Bus 418 can be any suitable mechanism for communicating between two or more components 402, 404, 406, 410, and 414 in some embodiments.

Any other suitable components can additionally or alternatively be included in hardware 400 in accordance with some embodiments.

It should be understood that at least some of the above-described blocks of the processes of FIGS. 1, 2, and 3A-3D can be executed or performed in any order or sequence not limited to the order and sequence shown in and described in the figures. Also, some of the above blocks of the processes of FIGS. 1, 2, and 3A-3D can be executed or performed substantially simultaneously where appropriate or in parallel to reduce latency and processing times. Additionally or alternatively, some of the above-described blocks of the processes of FIGS. 1, 2, and 3A-3D can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for sharing user-provided information from an original equipment manufacturer (OEM) application and a vendor application, comprising:
   receiving the user-provided information at the OEM application;
   determining a system identifier of a system on which the OEM application is executing at the OEM application using a hardware processor;
   providing the user-provided information and the system identifier to a vendor cloud server from the OEM application;
   determining the system identifier at the vendor application;
   providing the system identifier from the vendor application to the vendor cloud server;
   receiving the user-provided information at the vendor application from the vendor cloud server in response to providing the system identifier to the vendor cloud server; and
   using the user-provided information to configure the vendor application.

2. The method of claim 1, wherein the user-provided information includes an email address of a user.

3. The method of claim 1, wherein the OEM application and the vendor application are being executed on a locked-down operating system.

4. The method of claim 3, wherein the locked-down operating system is a locked-down version of MICROSOFT WINDOWS.

5. The method of claim 1, wherein determining the system identifier at the OEM application includes receiving the system identifier from an application programming interface (API) of a locked-down operating system on which the OEM application is executing.

6. The method of claim 1, wherein determining the system identifier at the vendor application includes receiving the system identifier from an application programming interface (API) of a locked-down operating system on which the vendor application is executing.

7. The method of claim 1, further comprising receiving instructions to customize the vendor application from the vendor cloud server in response to providing the system identifier to the vendor cloud server.

8. A system for sharing user-provided information from an original equipment manufacturer (OEM) application and a vendor application, comprising:
   a memory; and
   at least one hardware processor collectively configured to:
      receive the user-provided information at the OEM application;
      determine a system identifier of a system on which the OEM application is executing at the OEM application;
      provide the user-provided information and the system identifier to a vendor cloud server from the OEM application;
      determine the system identifier at the vendor application;
      provide the system identifier from the vendor application to the vendor cloud server;
      receive the user-provided information at the vendor application from the vendor cloud server in response to providing the system identifier to the vendor cloud server; and
      use the user-provided information to configure the vendor application.

9. The system of claim 8, wherein the user-provided information includes an email address of a user.

10. The system of claim 8, wherein the OEM application and the vendor application are being executed on a locked-down operating system.

11. The system of claim 10, wherein the locked-down operating system is a locked-down version of MICROSOFT WINDOWS.

12. The system of claim 8, wherein determining the system identifier at the OEM application includes receiving the system identifier from an application programming interface (API) of a locked-down operating system on which the OEM application is executing.

13. The system of claim 8, wherein determining the system identifier at the vendor application includes receiving the system identifier from an application programming interface (API) of a locked-down operating system on which the vendor application is executing.

14. The system of claim 8, wherein the at least one hardware processor is collectively further configured to receive instructions to customize the vendor application from the vendor cloud server in response to providing the system identifier to the vendor cloud server.

15. A non-transitory computer-readable medium containing computer-executable instructions that, when executed by a processor, cause the processor to perform a method for sharing user-provided information from an original equipment manufacturer (OEM) application and a vendor application, the method comprising:
   receiving at the OEM application;
   determining a system identifier of a system on which the OEM application is executing at the OEM application;
   providing the user-provided information and the system identifier to a vendor cloud server from the OEM application;
   determining the system identifier at the vendor application;

providing the system identifier from the vendor application to the vendor cloud server;

receiving the user-provided information at the vendor application from the vendor cloud server in response to providing the system identifier to the vendor cloud server; and using the user-provided information to configure the vendor application.

16. The non-transitory computer-readable medium of claim 15, wherein the user-provided information includes an email address of a user.

17. The non-transitory computer-readable medium of claim 15, wherein the OEM application and the vendor application are being executed on a locked-down operating system.

18. The non-transitory computer-readable medium of claim 15, wherein determining the system identifier at the OEM application includes receiving the system identifier from an application programming interface (API) of a locked-down operating system on which the OEM application is executing.

19. The non-transitory computer-readable medium of claim 15, wherein determining the system identifier at the vendor application includes receiving the system identifier from an application programming interface (API) of a locked-down operating system on which the vendor application is executing.

20. The non-transitory computer-readable medium of claim 15, wherein the method further comprises receiving instructions to customize the vendor application from the vendor cloud server in response to providing the system identifier to the vendor cloud server.

* * * * *